United States Patent [19]
Durand

[11] 3,916,708
[45] Nov. 4, 1975

[54] REPLACEABLE INSERT FOR THE DRIVE SPROCKET OF A TRACK-TYPE VEHICLE

[75] Inventor: James C. Durand, Peoria, Ill.

[73] Assignee: Caterpillar Tractor Co., Peoria, Ill.

[22] Filed: Sept. 6, 1974

[21] Appl. No.: 503,594

[52] U.S. Cl............ 74/243 R; 74/243 DR; 74/443; 74/447; 74/229
[51] Int. Cl.² ........................................ F16H 55/30
[58] Field of Search ..... 74/243 R, 243 DR, 243 PC, 74/443, 446, 447, 448, 461, 229

[56] References Cited
UNITED STATES PATENTS

| | | | |
|---|---|---|---|
| 1,870,801 | 8/1932 | Engstrom | 74/243 PC |
| 2,374,644 | 5/1945 | Bombardier | 74/243 PC |
| 3,504,562 | 4/1970 | Hirych | 74/461 |

Primary Examiner—Samuel Scott
Assistant Examiner—Allan R. Burke
Attorney, Agent, or Firm—Phillips, Moore, Weissenberger Lempio & Strabala

[57] ABSTRACT

A drive sprocket for driving an endless track of a track-type vehicle comprises a hub having a plurality of circumferentially disposed teeth on the periphery thereof to define a notch between each pair of adjacent teeth. A U-shaped metallic insert is disposed in each of the notches and is secured to the hub by retaining means comprising a plurality of tabs formed on the underside of the insert. Each of the tabs may be retained on the hub solely by a like-shaped retaining notch formed therein or by a releasable plate attached to the hub or by a pin engaging each of the tabs. A layer of elastomeric material may be disposed between each of the inserts and the hub to absorb shock loads imposed on the sprocket during vehicle operation.

21 Claims, 7 Drawing Figures

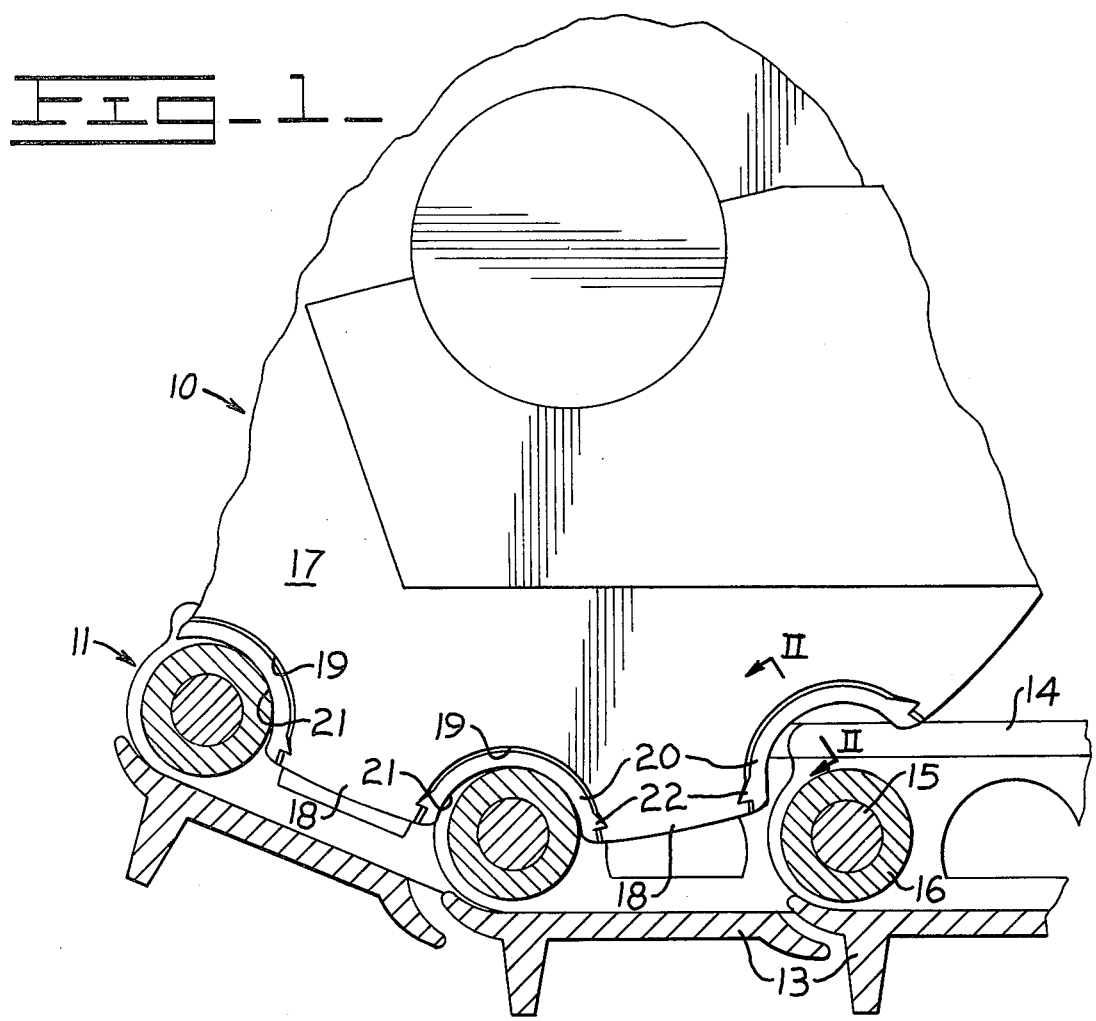
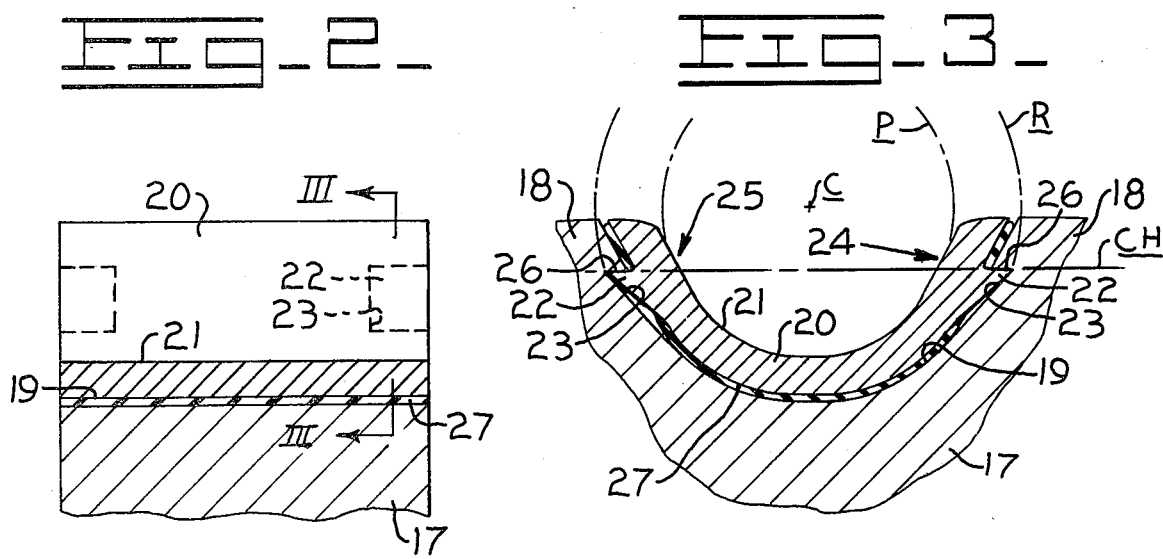

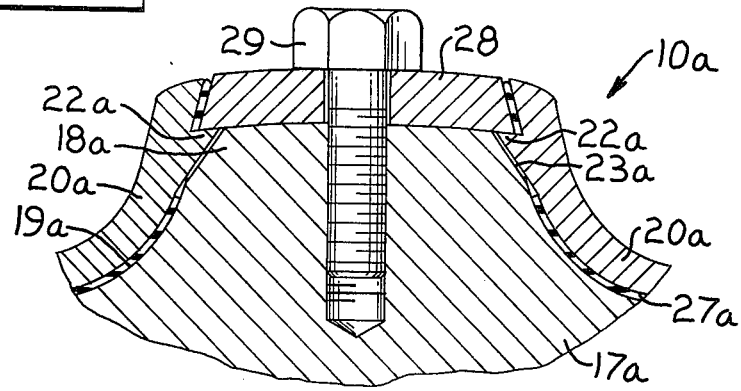
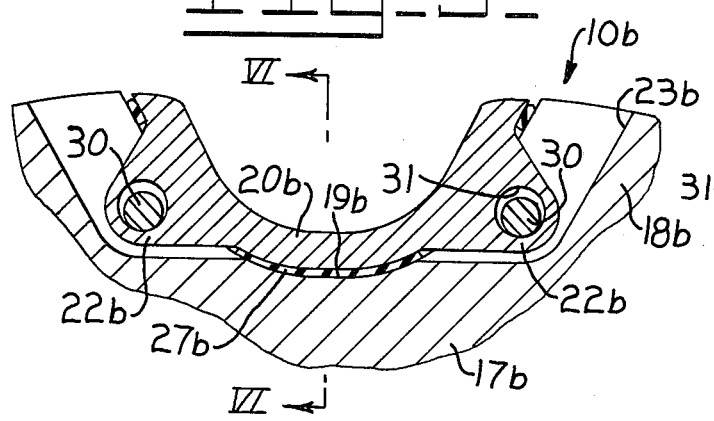 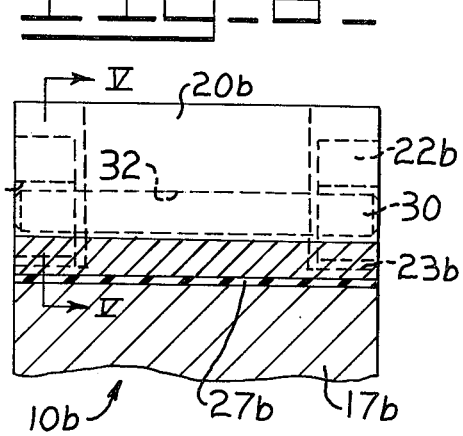
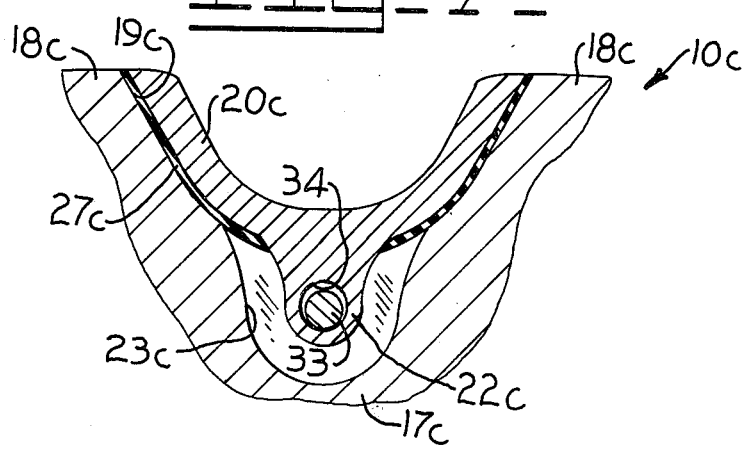

REPLACEABLE INSERT FOR THE DRIVE SPROCKET OF A TRACK-TYPE VEHICLE

BACKGROUND OF THE INVENTION

The drive sprockets employed on track-type tractors to drive the endless track assemblies thereof are subjected to severe shock loads and a high rate of wear. Such wear is primarily induced by the metal-to-metal contact occurring between the sprocket teeth and the endless track assembly during tractor operation. Many design improvements, such as the hunting tooth sprocket and machining of the sprocket teeth to precisely control shape, root diameter and back lash have greatly reduced such wear.

However, periodic replacement of the sprocket teeth is nevertheless required. One approach to such periodic replacement is to construct the sprocket teeth in segments, detachably connected to a hub of the sprocket to thus curtail the need to replace all of the sprocket teeth. Another solution for extending the service life of the sprocket teeth is found in U.S. application Ser. No. 416,828, filed on Nov. 19, 1973 by Roger L. Boggs, et al for "Impact Absorbing Noise Suppression Device," such application having been assigned to the assignee of this application.

The sprocket construction disclosed in the above-referenced U.S. application provides cushioning means for substantially absorbing impact loads and for suppressing the noise level of the engaged sprocket and track assembly during operation thereof. Such noise suppressing problem is also recognized in U.S. Pat. Nos. 1,870,801 and 3,504,562. The latter patent further suggests the use of replaceable wear plates on the sprocket.

SUMMARY OF THIS INVENTION

An object of this invention is to overcome the above, briefly described problems by providing the drive sprocket of a track-type vehicle with a plurality of replaceable inserts at the teeth thereof to facilitate expeditions servicing and repair. The drive sprocket comprises a hub having a plurality of teeth circumferentially disposed on its periphery to define a generally U-shaped notch between each pair of adjacent teeth. The insert is generally U-shaped and is cradled within a respective notch to define a substantially smooth and uninterrupted root profile thereon. Retaining means for securing an underside of each of the inserts to the hub may comprise a plurality of tabs secured beneath the insert and attached to the hub solely by means of a retaining notch formed therein or by a separable plate or pin employed in conjunction with the notch.

In the preferred embodiment of this invention, an elastomeric pad is disposed between each of the inserts and the hub to substantially suppress the noise levels normally prevalent during sprocket operation.

BRIEF DESCRIPTION OF THE DRAWINGS

Further objects of this invention will become apparent from the following description and accompanying drawings wherein:

FIG. 1 is a fragmentary side elevational view of a drive sprocket engaged with an endless track assembly of a track-type vehicle;

FIG. 2 is an enlarged sectional view of a replaceable first embodiment of this invention employed on the drive sprocket, taken generally in the direction of arrows II—II in FIG. 1 but shown in an inverted disposition;

FIG. 3 is a sectional view taken in the direction of arrows III—III in FIG. 2;

FIG. 4 is a fragmentary side elevational view illustrating a second insert embodiment of this invention;

FIG. 5 is a view similar to FIG. 3, but illustrating a third insert embodiment of this invention;

FIG. 6 is a sectional view, taken in the direction of arrow VI—VI in FIG. 5; and FIG. 7 is a view similar to FIG. 3, but illustrating a fourth insert embodiment of this invention.

DETAILED DESCRIPTION OF THE INVENTION

FIG. 1 partially illustrates a sprocket 10 for driving an endless track assembly 11 of a track-type vehicle. The track assembly is conventional and comprises a plurality of track shoes 13, each having a pair of laterally spaced links 14 (one shown) secured thereto with each pair of longitudinally adjacent links being interconnected by a pin 15 and a bearing bushing 16. The sprocket comprises a generally annular hub 17 having a plurality of teeth 18 disposed on the periphery thereof to define a generally U-shaped notch 19 between each pair of circumferentially adjacent teeth.

A generally U-shaped metallic insert 20 conforms to the shape of a respective notch 19 and is cradled therein. Each insert defines a substantially smooth and uninterrupted root profile or bearing surface 21 thereon adapted to engage a bushing 16 for track driving purposes. As suggested above, such engagement imposes substantial loads on the sprocket teeth to cause wear thereat and also induces the creation of a high noise level thereat.

The construction and arrangement of insert 20, shown in detail in FIGS. 2 and 3, facilitates expeditious replacement of one or more of the inserts and also aids in substantially reducing such noise level over conventional track driving arrangements. The insert, preferably composed of a hardened metallic material such as steel hardened by conventional metallurgical techniques, comprises a pair of retaining tabs 22 integrally formed on the underside of the insert and positioned adjacent to each end thereof. The tabs are each V-shaped and may be suitably crimped or otherwise deformed during assembly to mechanically engage a like-shaped retaining notch 23, formed in hub 17 of the sprocket in locked relationship therewith.

As shown in FIG. 3, a first pair of the tabs are disposed adjacent to an area 24 of one tooth 18 whereat drive side wear normally occurs when the vehicle operates in a forward direction. The second pair of circumferentially displaced tabs are disposed adjacent to an area 25 of a second, circumferentially adjacent tooth whereat reverse drive side wear occurs when the vehicle operates in a reverse direction. Thus, such drive will tend to bear against the insert at areas 24 and 25 to urge the tabs into continued locked engagement within their respective notches 23.

As further shown in FIG. 3, each of the tabs further comprises a bearing surface 26 which lies at least approximately in a plane defined by a chord CH of an imaginary circle R, all of which at least approximately intersect each pair of circumferentially spaced tabs. Circle R is defined by a center C which further defines a second imaginary circle P generally conforming to bearing surface 21 of the insert. The chord is preferably disposed substantially inwardly of the insert from center C, which further comprises the approximate center of pin 15 and bushing 16 when the insert is engaged thereby.

In the preferred embodiment of this invention, a cushioning means 27, preferably comprising a layer of elastomeric material, is sandwiched between the insert and notch 19 to absorb shock loads generated in the sprocket during vehicle operation and to reduce the noise level thereat. The elastomeric material, at least substantially covering an underside of the insert, may comprise a standard reinforced rubber or plastic material well-known in the art for this purpose. Tabs 22 pierce through the layer of elastomeric material to secure it in position and the layer preferably at least substantially covers the notch and backside of the insert. Also, the cushioning means could be suitably bonded to the hub and/or the insert, if so desired.

FIGS. 4, 5, 6 and 7 illustrate three additional insert embodiments of this invention wherein identical numerals are used to depict corresponding constructions. The numerals depicting modified constructions are each accompanied by letter "a", "b", or "c" for the respective embodiments.

Referring to FIG. 4, a partially illustrated second sprocket embodiment 10a comprises a hub 17a having a plurality of circumferentially disposed teeth 18a formed thereon to define a notch 19a between each pair of circumferentially adjacent teeth. A U-shaped insert 20a is secured in place in each notch by retaining means comprising two pairs of circumferentially spaced V-shaped tabs 22a each disposed in a like-shaped notch 23a. The notch is defined on a side of tooth 18a and is closed at one end thereof by an overlapping end of a plate 28, releasably attached to the tooth by a bolt 29.

A cushioning means 27a, comprising a layer of elastomeric material, is disposed between the insert and the hub and is secured in place thereon by tabs 22a which pierce therethrough. The relative positioning and further constructional details of the insert 20a (as well as hereinafter described inserts 20b and 20c), including tabs 22a thereof, are substantially similar to that disclosed above in connection with the description of the FIGS.- 1–3 insert embodiment.

FIGS. 5 and 6 partially illustrate a third sprocket embodiment 10b comprising a hub 17b having a plurality of circumferentially disposed teeth 18b formed on the periphery thereof. A notch 19b, defined between each pair of circumferentially adjacent teeth, has a U-shaped insert 20b cradled therein. The insert comprises two pairs of circumferentially spaced tabs 22b each attached to the hub by a pin 30 extending transversely through a pair of aligned apertures 31 formed through the tabs and an elongate bore 32 formed through tooth 18b.

The apertures are slightly oversized to permit slight movements of the insert relative to the hub. Each tab is disposed in a notch 23b whereby the laterally spaced tabs each straddle a side of a respective tooth 18b in substantially flush relationship therewith. A cushioning means 27b, comprising a layer of elastomeric material, is disposed between the insert and the hub for cushioning and anti-noise purposes.

FIG. 7 partially illustrates a fourth sprocket embodiment 10c comprising a hub 17c having an insert 20c cradled in a notch 19c defined between a pair of circumferentially adjacent teeth 18c. The insert comprises a single pair of laterally spaced tabs 22c each disposed in a notch 23c formed on a respective outboard side of hub 17c. A laterally extending pin 33 projects through aligned apertures 34, formed through the tabs, and a bore (not shown) formed through the hub to retain the insert in position thereon. A cushioning means 27c, comprising a layer of elastomeric material, is disposed between the insert and the hub.

I claim:

1. A vehicle drive sprocket, for driving an endless track of a track-type vehicle comprising
   a hub;
   a plurality of teeth circumferentially disposed on a periphery of said hub to define a generally U-shaped notch between each pair of adjacent teeth;
   a generally U-shaped and hardened metallic insert conforming to the shape of a respective notch and cradled therein to at least substantially cover the same, said insert defining a substantially smooth and uninterrupted root profile thereon; and
   retaining means, including a plurality of retaining tabs integrally formed on each of said inserts, resiliently biasing and securing such within each U-shaped notch.

2. The drive sprocket of claim 1 further comprising elastomeric cushioning means sandwiched between each of said inserts and said hub.

3. The drive sprocket of claim 2 wherein said cushioning means at least substantially covers an underside of said insert.

4. The drive sprocket of claim 1 wherein a pair of laterally spaced tabs are integrally formed on each of said inserts adjacent to each circumferential end thereof.

5. The drive sprocket of claim 4 wherein a plane defined by a chord of an imaginary circle, all of which at least approximately intersect said pairs of tabs, is disposed substantially inwardly of the insert from a center of said circle.

6. The drive sprocket of claim 4 wherein each of said tabs is generally V-shaped and wherein said retaining means further comprises a like-shaped retaining notch defined in said hub and accommodating a respective tab therein.

7. The drive sprocket of claim 6 wherein each of said retaining notches is formed solely on said hub.

8. The drive sprocket of claim 6 wherein each of said retaining notches is defined in said hub and by a plate releasably attached to said hub.

9. The drive sprocket of claim 8 wherein each pair of said tabs straddle said hub to expose said tabs on either side thereof.

10. The drive sprocket of claim 8 wherein a said plate is attached by releasable fastening means on an outer end of each of said teeth to aid in defining one of said retaining notches beneath each circumferential end thereof.

11. The drive sprocket of claim 4 wherein said retaining means further comprises a pin attaching each of said tabs to said hub.

12. The drive sprocket of claim 1 wherein a single pin extends through aligned bores formed through each pair of tabs and through a respective tooth.

13. The drive sprocket of claim 1 wherein only one pair of said tabs is formed integrally on said insert to extend thereunder and wherein said retaining means further comprises a pin extending through aligned bores formed through said tabs and through said hub.

14. The drive sprocket of claim 12 wherein said tabs are disposed intermediate the ends of said insert.

15. The drive sprocket of claim 1 further comprising an endless track assembly of a track-type vehicle entrained therearound.

16. A replaceable insert in combination with a of a track-type vehicle, said insert being composed of a hardened metallic material and having a general U-shape to define a substantially smooth and uninterrupted root profile thereon, and a plurality of retaining tabs integrally formed on said insert, attaching and resiliently biasing said insert within a U-shaped notch of said drive sprocket.

17. The combination of claim 16 wherein a pair of laterally spaced tabs are formed integrally on an underside of said insert, adjacent to each end thereof.

18. The combination of claim 17 wherein each of said tabs is generally V-shaped.

19. The combination of claim 16 wherein only one pair of said tabs are formed integrally on an underside of said insert to extend thereunder.

20. The combination of claim 19 wherein said tabs are disposed intermediate the ends of said insert.

21. The combination of claim 20 further comprising means forming a pair of aligned bores through said tabs.

* * * * *

UNITED STATES PATENT AND TRADEMARK OFFICE
CERTIFICATE OF CORRECTION

PATENT NO. : 3,916,708
DATED : November 4, 1975
INVENTOR(S) : James Durand

It is certified that error appears in the above—identified patent and that said Letters Patent are hereby corrected as shown below:

Column 5, claim 16, after "with a" insert --drive sprocket--.

Signed and Sealed this tenth Day of February 1976

[SEAL]

Attest:

RUTH C. MASON
*Attesting Officer*

C. MARSHALL DANN
*Commissioner of Patents and Trademarks*